US012737301B2

(12) United States Patent
Vakharwala et al.

(10) Patent No.: US 12,737,301 B2
(45) Date of Patent: Sep. 15, 2026

(54) SOFTWARE INTERFACE TO XPU ADDRESS TRANSLATION CACHE

(71) Applicant: Intel Corporation, Santa Clara, CA (US)

(72) Inventors: Rupin H. Vakharwala, Hillsboro, OR (US); Philip Lantz, Cornelius, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/899,912

(22) Filed: Aug. 31, 2022

(65) Prior Publication Data

US 2022/0414020 A1 Dec. 29, 2022

Related U.S. Application Data

(60) Provisional application No. 63/332,186, filed on Apr. 18, 2022.

(51) Int. Cl.

| | |
|---|---|
| ***G06F 12/10*** | (2016.01) |
| ***G06F 12/08*** | (2016.01) |
| ***G06F 12/0891*** | (2016.01) |
| ***G06F 12/1027*** | (2016.01) |

(52) U.S. Cl.

CPC ...... *G06F 12/1027* (2013.01); *G06F 12/0891* (2013.01)

(58) Field of Classification Search

CPC ......................... G06F 12/1027; G06F 12/0891

See application file for complete search history.

(56) References Cited

U.S. PATENT DOCUMENTS

| | | | | |
|---|---|---|---|---|
| 2007/0180157 | A1 | 8/2007 | Irish et al. | |
| 2008/0189720 | A1 | 8/2008 | Moertl et al. | |
| 2008/0209130 | A1 * | 8/2008 | Kegel | G06F 12/1081 711/135 |
| 2018/0181488 | A1 | 6/2018 | Fowler et al. | |
| 2019/0138240 | A1 | 5/2019 | Gayen et al. | |
| 2020/0210345 | A1 * | 7/2020 | Seo | G06F 3/0679 |
| 2022/0050781 | A1 | 2/2022 | Acharya et al. | |
| 2022/0091986 | A1 * | 3/2022 | Kotra | G06F 9/3804 |
| 2022/0414020 | A1 | 12/2022 | Vakharwala et al. | |

OTHER PUBLICATIONS

International Searching Authority, International Search Report and Written Opinion dated Aug. 18, 2023 in PCT International Application No. PCT/US2023/063898 (11 pages).

(Continued)

*Primary Examiner* — Masud K Khan

(74) *Attorney, Agent, or Firm* — Gray Ice Higdon, PLLC

(57) ABSTRACT

In an embodiment, a core includes at least one execution circuit. The core may be configured to: send a command for a first address translation cache (ATC) of a first device to perform an operation, the core to send the command to a first device queue of a shared memory, the first device queue associated with the first ATC; and send a register write directly to the first device to inform the first ATC regarding presence of the command in the first device queue. Other embodiments are described and claimed.

20 Claims, 8 Drawing Sheets

(56) References Cited

OTHER PUBLICATIONS

U.S. Appl. No. 16/912,542, filed Jun. 25, 2020, entitled "Secure Address Translation Services Using Cryptographically Protected Host Physical Address," by Michael Kounavis, et al.
U.S. Appl. No. 17/133,570, filed Dec. 23, 2020, entitled "64-BIT Virtual Addresses Having Metadata Bit(s) and Canonicality Check That Does Not Fail Due to Non-Canonical Values of Metadata Bit(s)," by Vedvyas Shanbhogue, et al.
U.S. Appl. No. 17/473,468, filed Sep. 13, 2021, entitled "Method and Apparatus to Enable a Cache (DEVPIC) to Store Process Specific Information Inside Devices That Support Address Translation Service (ATS)," by Rupin Vakharwala, et al.

* cited by examiner $130_n$
$130_0$
XPU
VA
132
DevTLB
VA
PA
135
PA
142
IOMMU
Root Complex
140
PA
120
Memory
$110_n$
CPU
112
VA
114
TLB
VA
116
MMU
PA
$110_0$
CPU
112
VA
114
TLB
VA
116
MMU
PA
100

600

SOFTWARE INTERFACE TO XPU ADDRESS TRANSLATION CACHE

CROSS-REFERENCE TO PROVISIONAL

This application claims the benefit of U.S. Provisional Application No. 63/332,186, filed on Apr. 18, 2022, and entitled "SOFTWARE INTERFACE TO XPU ADDRESS TRANSLATION CACHE."

BACKGROUND

There has been increased adoption of devices that support the Address Translation Service (ATS) of a Peripheral Component Interconnect Express (PCIe) architecture. More specifically, according to the PCIe Base Specification version 5.0 (2019), ATS provides a set of transactions for PCIe components to exchange and use translated addresses in support of native input/output (I/O) virtualization. However inefficiencies still exist.

DETAILED DESCRIPTION

Figure 1:
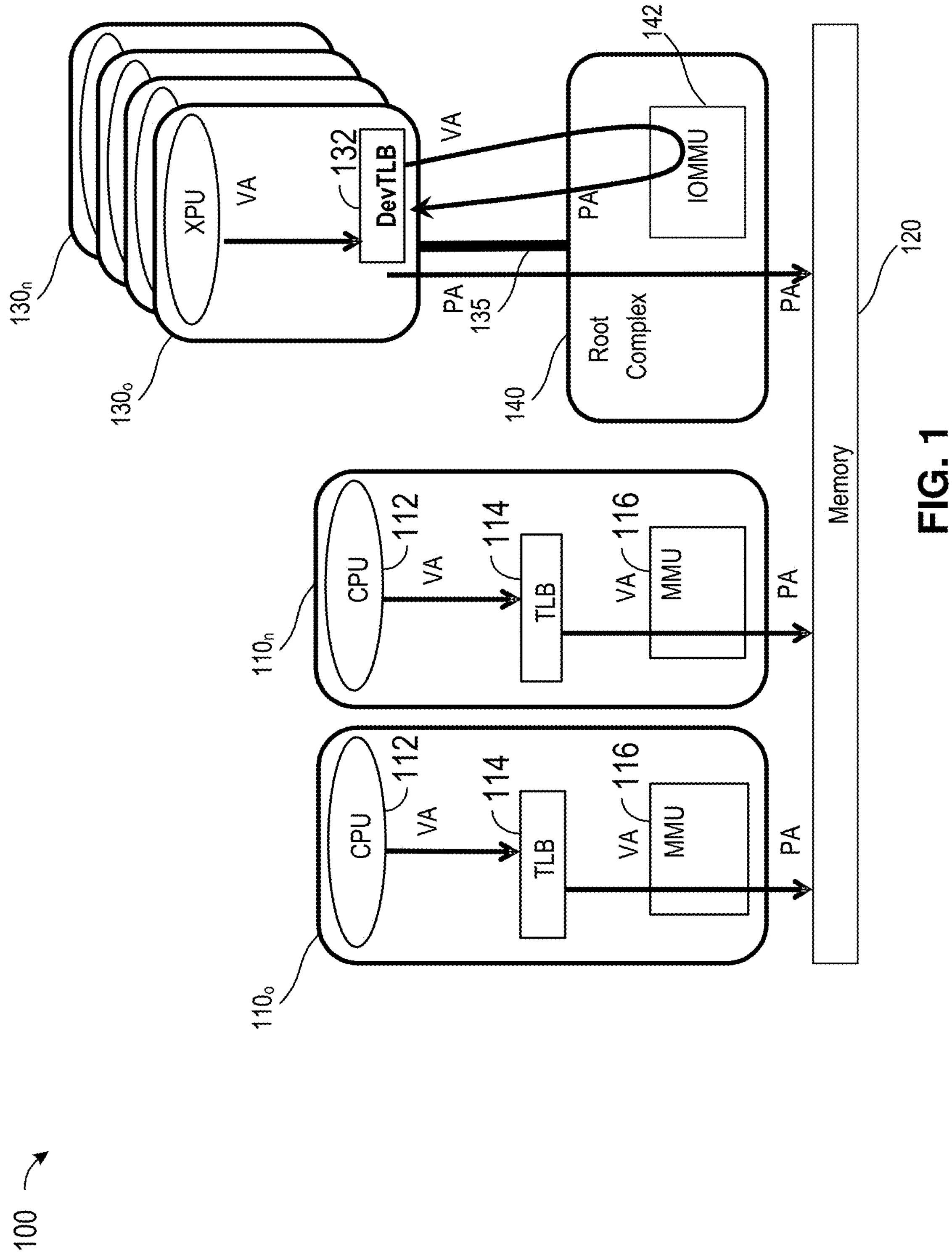
FIG. 1 is a diagram showing a shared virtual memory (SVM) and PCIe ATS, in accordance with various embodiments.

FIG. 1 is a diagram showing a shared virtual memory (SVM) and PCIe ATS, in accordance with various embodiments. Legacy computers are heterogenous systems that combine general purpose CPUs with specialized XPUs. Such systems are beginning to support SVM, where applications running on CPUs submit work to XPUs using virtual addresses, and expect that XPUs will be able to manipulate memory using virtual addresses just like the CPU. Using the page tables setup by Virtual Machines (VMs) and Virtual Machine Monitors (VMMs), memory management units (MMUs) translate Virtual Addresses (VA) into Physical Addresses (PA) for CPUs, and IOMMUs translate Virtual Addresses into Physical Addresses for XPUs as shown in FIG. 1. SVM allows CPUs and XPUs to manipulate complex data structures (e.g., trees) in memory without needless data copying. SVM also enables XPUs to handle page-faults, removing the requirement for XPUs to pin their memory, and thereby, for example, have a much larger working set size.

In the embodiment of FIG. 1, a computer system 100 may be any type of computing platform, ranging from small portable devices such as smartphones, tablet computers and so forth to larger devices such as client systems, e.g., desktop systems, server systems and so forth. As shown, system 100 includes a plurality of CPUs 110$_0$-110$_n$. CPUs 110 communicate with a memory 120, which may be implemented as a SVM that is further shared with a set of devices 130$_0$-130$_n$. Although shown generically in FIG. 1 as XPUs, understand that many different types of devices such as various PCIe or other such devices may be present in a given system. As further shown, a root complex 140 provides an interface between memory 120 and XPUs 130.

As illustrated in the high level of FIG. 1, CPUs 110 may include a processor complex (generally 112) which may include one or more cores or other processing engines. As seen, software that executes on these processing units may output VAs that may be provided to a translation lookaside buffer (TLB) 114. In general, TLBs 114 may buffer VA-to-PA addresses and potentially additional information. Such cache capability may be on behalf of a memory management unit (MMU) 116, which may include a greater set of address translations by way of a multi-level page table structure. In addition, MMU 116 may further include page miss handling circuitry to obtain address translations, e.g., from memory 120 when not present.

Similarly, root complex 140 includes another MMU, namely an IOMMU 142, that may store address translations on behalf of XPUs 130. Thus as shown, requests for translation may be received in root complex 140 from given XPUs 130 and in turn IOMMU 142 provides a physical address. Such translations may be stored in a TLB within XPU 130, referred to as a device TLB or more particularly herein, an address translation cache (ATC) 132. Then, with this physical address an XPU can send a memory request (e.g., read or write) to memory 120 with a given physical address. Note that in different implementations, root complex 140 may be a separate component or can be present in an SoC with a given one or more CPUs.

In different embodiments, an interconnect 135 that couples XPUs 130 to root complex 140 may provide communication according to one or more communication protocols such as PCIe, Compute Express Link (CXL) (such as a CXL.io protocol) or an integrated on-chip scalable fabric (IOSF), as examples.

One of the many challenges that legacy XPUs face when trying to take advantage of SVM is to build a PCIe ATS. ATS allows XPUs to request address translations from the IOMMU (aka Translation Agent—TA) and cache the results in a translation cache, ATC, which decouples the translation caching requirement of XPUs from the translation caches available in Root Complex IOMMU. SVM allows CPUs and XPUs to share a virtual memory. With embodiments, a communication interface is provided to enable direct communication between software in execution on CPUs 110 and ATCs 132 of XPUs 130.

As discussed, PCIe ATS may allow XPUs to build an ATC to improve performance. However, legacy definitions of the ATS may not allow system software to communicate with an ATC. Instead, legacy definitions may require system software to use a IOMMU as a "middle-man," and all the communication between system software and ATC may occur via IOMMU. As XPUs have become more powerful, this IOMMU as "middle-man" approach has become a bottleneck and that may prevent system software from managing XPUs to achieve the best performance.

Embodiments herein relate to an architectural interface for ATC that may allow system software to uniformly manage XPU-ATCs through this interface. Although embodiments may generally be described with respect to messages that match legacy capabilities, it will be recognized that concepts herein may be extended to provide additional messages for new capabilities for other ATS configurations such as a future ATS 2.0 specification.

Some embodiments may allow system software to receive Page Requests from ATC without any impact to device-driver. In future embodiments, if the ATC needed to send sensitive information and it did not trust device driver, then the ATC may fall back to the legacy approach of sending the information via IOMMU.

Generally, by removing IOMMU from the communication path between system software and XPU-ATC, embodiments herein may remove a central bottleneck and enable parallel communication between system software and various XPUs, improving performance and scalability of the system. Additionally, embodiments may allow for the removal of hardware related to system software-to-XPU-ATC communication, reduce area, and significantly reduce complexity in IOMMUs and Root-Complexes.

The ATC invalidations/completion and Page Request/Response commands in ATS 1.0 use PCIe Messages, which are headers that travel on the PCIe bus without benefiting from link encryption. Embodiments herein may define all such commands as Memory Read/Write commands, and thus may benefit from link encryption and improve security of the system. More generally, Page Requests and Page Responses may benefit from subsequent link-encryption.

ATS may generally support one or more elements of the following functionality.

(1) ATC-IOMMU interface: This may be a bidirectional interface that allows XPU to request address translations from the IOMMU (aka Translation Agent—TA) and cache the results in the ATC. Next, the ATC-IOMMU may use the results from ATC in translated requests to access memory.

(2) System software-ATC interface: This may be a unidirectional interface that allows System software to issue invalidations to ATC to remove stale translations from ATC.

(3) ATC-System software interface: This may be a unidirectional interface that allows XPU to report page-fault to system software.

Embodiments herein relate to a scalable architectural interface for at least functionality 2 and 3 provided by ATS.

Because software is communicating with ATC directly (e.g., without IOMMU as a "middle-man"), and because the ATC described herein may be or become an industry standard, the software may be able to communicate with various ATCs with a single piece of software that does not require vendor specific versions.

Figure 2:
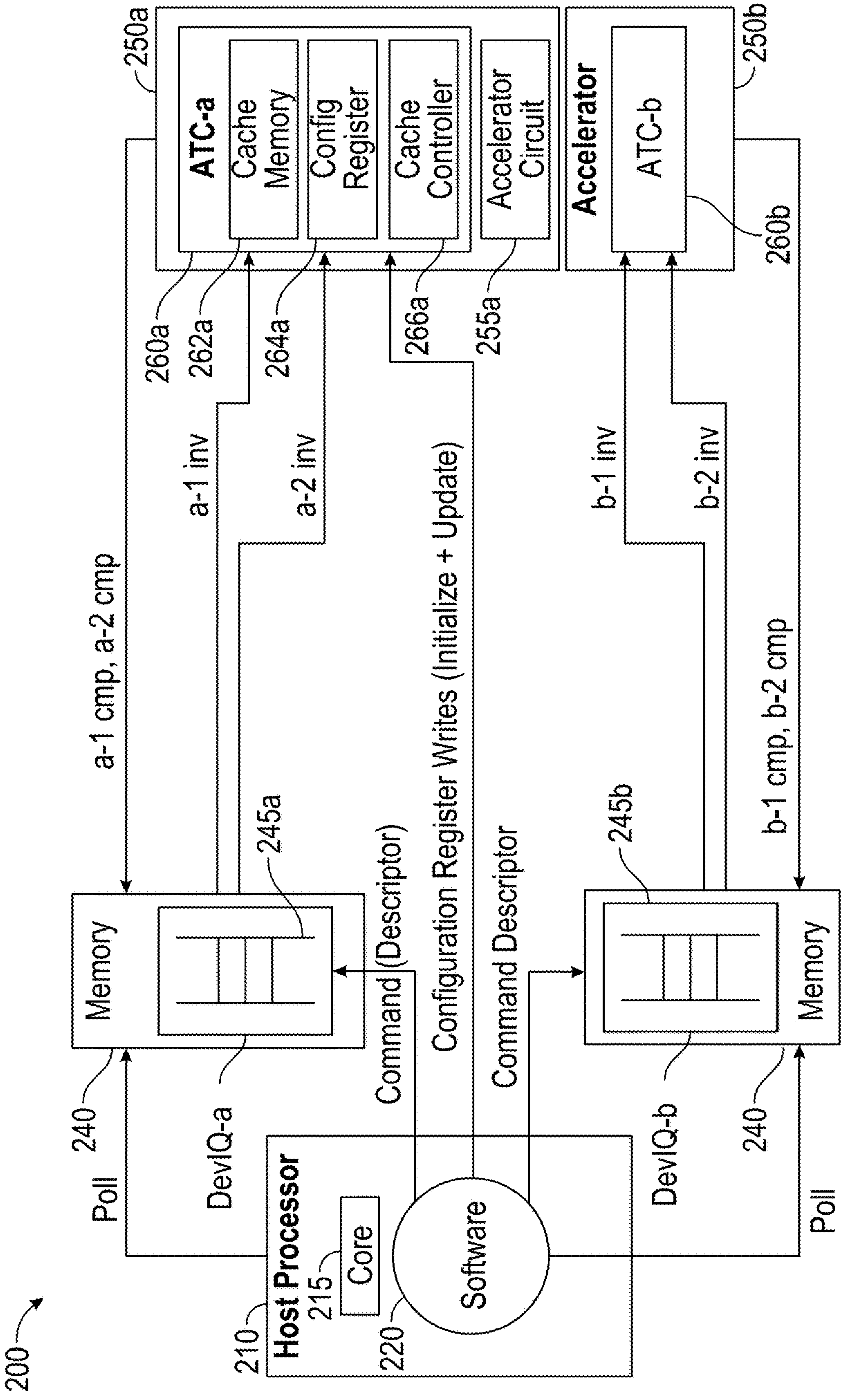
FIG. 2 is a block diagram of a computing system illustrating an interface in accordance with an embodiment.

Referring now to FIG. 2, shown is a block diagram of a computing system in accordance with an embodiment. As seen in the high level of FIG. 2, computing system 200 (which may be any type of computing device ranging from small portable devices such as smartphones, tablets or so forth to larger systems including client or other desktop systems, server systems or so forth) includes a host processor 210 that couples to a memory 240. As an example, host processor 210 may be some type of multicore processor or other system on chip (SoC) that in turn is coupled to memory 240, which may be implemented as a dynamic random access memory (DRAM).

As further illustrated, host processor 210 couples to multiple accelerators $\mathbf{250}_{A,B}$. Although two accelerators are shown in this implementation, additional accelerators may be present in a particular implementation. As one example, accelerators 250 may be graphics processors, where each accelerator 250 includes a plurality of independent graphics processing units (GPUs). In some cases, accelerators 250 may be homogenous devices, while in other cases, disparate types of devices may be present.

In any event, in the high level view shown in FIG. 2, direct communication paths are provided between host processor 210 and accelerators 250. More particularly as described herein, host processor 210 may be in direct communication with ATCs $260_{A,B}$ included within accelerators $\mathbf{250}_{A,B}$, via a direct software-to-ATC communication interface. In this way, the overhead and complexity of communicating indirectly between host processors and ATCs through an IOMMU or other intermediary can be avoided.

With further reference to FIG. 2, host processor 210 includes at least one core 215 (of course many cores may be present in particular implementations). Core 215 may be any type of processing core and in different implementations may be an in-order or out-of-order processing core. A software 220 is illustrated that may execute on core 215. In various implementations, software 220 may be a system software such as an operating system, hypervisor, firmware or so forth.

For purposes of discussion herein, assume that software 220 seeks to directly communicate with ATC $260_A$ (e.g.,) via an interface in accordance with an embodiment. As such, software 220 may directly communicate with ATC $260_A$ using an interface in accordance with an embodiment. For providing commands to ATC $260_A$, software 220 may write such commands (in the form of descriptors) into a device queue $\mathbf{245}_A$ present within memory 240. In turn, software 220 may then communicate information regarding this command by way of a configuration register write directly to ATC $260_A$.

Thus as shown in FIG. 2, for each ATC 260 the software may use a standard circular buffer in memory with head/tail pointers to put commands for the ATC. Software may then ask the ATC to take the commands and process them by updating the tail pointer, which is a register in ATC. In FIG. 2, this buffer is device queue 245, also referred to as a Device Invalidation Queue (DevIQ), that may store commands for the specific ATC 260 (A or B). Note that there is no IOMMU involved in this process.

As illustrated, each ATC 260 may include a cache memory 262, one or more configuration registers 264, and a cache controller 266. Although embodiments are not limited in this regard, configuration registers 264 may be implemented as part of an accelerator's PCIe configuration space and may provide storage for various information, including a queue base, head and tail pointers and certain process address space identifier (PASID) and privilege information associated with this device queue.

To perform initialization of device queue 245, software 220 may write, e.g., via a configuration register write, directly to ATC $260_A$ to write this initialization information regarding the device queue $\mathbf{245}_A$ into configuration register(s) $\mathbf{264}_A$. Thereafter, when commands are written into device queue $\mathbf{245}_A$, software 220 may send a configuration register write, e.g., to update the tail pointer, to indicate presence of this additional command.

In some embodiments, the software may describe DevIQ to ATC by programming one or more configuration registers that may be included in an XPUs PCIe Configuration Space:

Queue Base—location of queue in memory

Head Pointer—offset from queue base where ATC will read the next command

Tail Pointer—offset from queue base where software will write the next command

DevIQ PASID—PASID value to be used by ATC when reading commands from DevIQ and writing completion record indicating to software that the command is complete DevIQ Privilege—Privilege value to be used by ATC when reading commands from DevIQ and writing completion record indicating to software that invalidation is complete.

Table 1 below describes various fields of the command that are common to all types of commands.

TABLE 1

| Field Name | Field Description | Field Width (number of bits) |
|---|---|---|
| Command | Command to be performed by ATC | 5 |
| CmpAddr (cacheline aligned) | Location of Cacheline where ATC will write completion record which includes any error reporting | 64 |
| CmpPASID | PASID value used with Memory Write to CmpAddr | 20 |
| CmpPriv | Priv value used with Memory Write to CmpAddr | 1 |

Although embodiments are described with respect to certain commands in DevIQ, the command descriptor field of 5 bits may allow for the inclusion of up to 32 commands and, if needed, the field can be expanded.

Additional fields when command is Invalidation-without-PASID are shown in Table 2, below.

TABLE 2

| Field Name | Field Description | Field Width (number of bits) |
|---|---|---|
| Address | Address range to be invalidated | 52 |
| Size | 0: Invalidate 4K region<br>1: Invalidate region defined by address bits | 1 |

Additional fields when command is Invalidation-with-PASID are shown in Table 3, below.

TABLE 3

| Field Name | Field Description | Field Width (number of bits) |
|---|---|---|
| Address | Address range to be invalidated | 52 |
| Size | 0: Invalidate 4K region<br>1: Invalidate region defined by address bits | 1 |
| PASID | Only invalidated entries belonging to the PASID | 20 |

Additional fields when command is Page Request Group Response is shown in Table 4, below.

TABLE 4

| Field Name | Field Description | Field Width (number of bits) |
|---|---|---|
| Page Request Group Index | ATC supplied index to which RC is responding | 9 |
| Response Code | response type of the associated PRG | 4 |

In some embodiments, a "Fence" command that is required in IOMMU as part of ATS 1.0 may no longer be needed, as each command provides feedback about its completion to system software. An "iTag" field that get sent to ATC as part of invalidation command in ATS 1.0 may no longer be needed. A "Destination Device ID" field may have been used in ATS 1.0 as Root-Complex/IOMMU needed that information to route the commands to appropriate ATC (XPU). However, in embodiments herein, each ATC knows from which DevIQ it is to obtain its commands from, so this field may be dropped.

In an embodiment, ATC 260 may monitor head and tail registers to determine if there are commands present. For example, if Head==Tail, ATC 260 knows that the queue is empty and there are no new commands. As soon as Head !=Tail, ATC 260 knows that the queue has some commands it needs to process and will read the commands from the queue (which may go through IOMMU DMA remapping process just like any other DMA read) and start processing it.

In one or more embodiments, ATC 260 may fetch one or more commands from the queue and process them serially or in parallel. ATC 260 may process the commands out-of-order. After completing each command, ATC 260 will write a completion record using a regular memory write (which may go through IOMMU DMA remapping process just like any other DMA write) that software monitors to get confirmation that the command it submitted is complete. If ATC 260 is using multiple virtual channels/traffic channels (VC/TC) to access memory it issues a ZLR memory read which is a Memory Read (MRd) with all byte enables as 0 and a length of one doubleword. This transaction from the device behaves like a read from all practical purposes. However, instead of sending data at the location specified by address, the root complex returns all zeros. This transaction may be sent on each of other VC/TC and completion of all ZLRs occurs before issuing the completion record on the main VC/TC.

While not separately described herein, understand that similar communications may occur between software 220 and accelerator 250$_B$ and its included ATC 260$_B$. Similarly, software 220 may write commands into device queue 245$_B$ associated with ATC 260$_B$.

While logically shown as separate entities, memory 240 may be a single unitary structure (e.g., one or more sets of dual inline memory modules (DIMMs)) of computing system 200. Understand while shown at this high level in the embodiment of FIG. 2, many variations and alternatives are possible.

Figure 3:
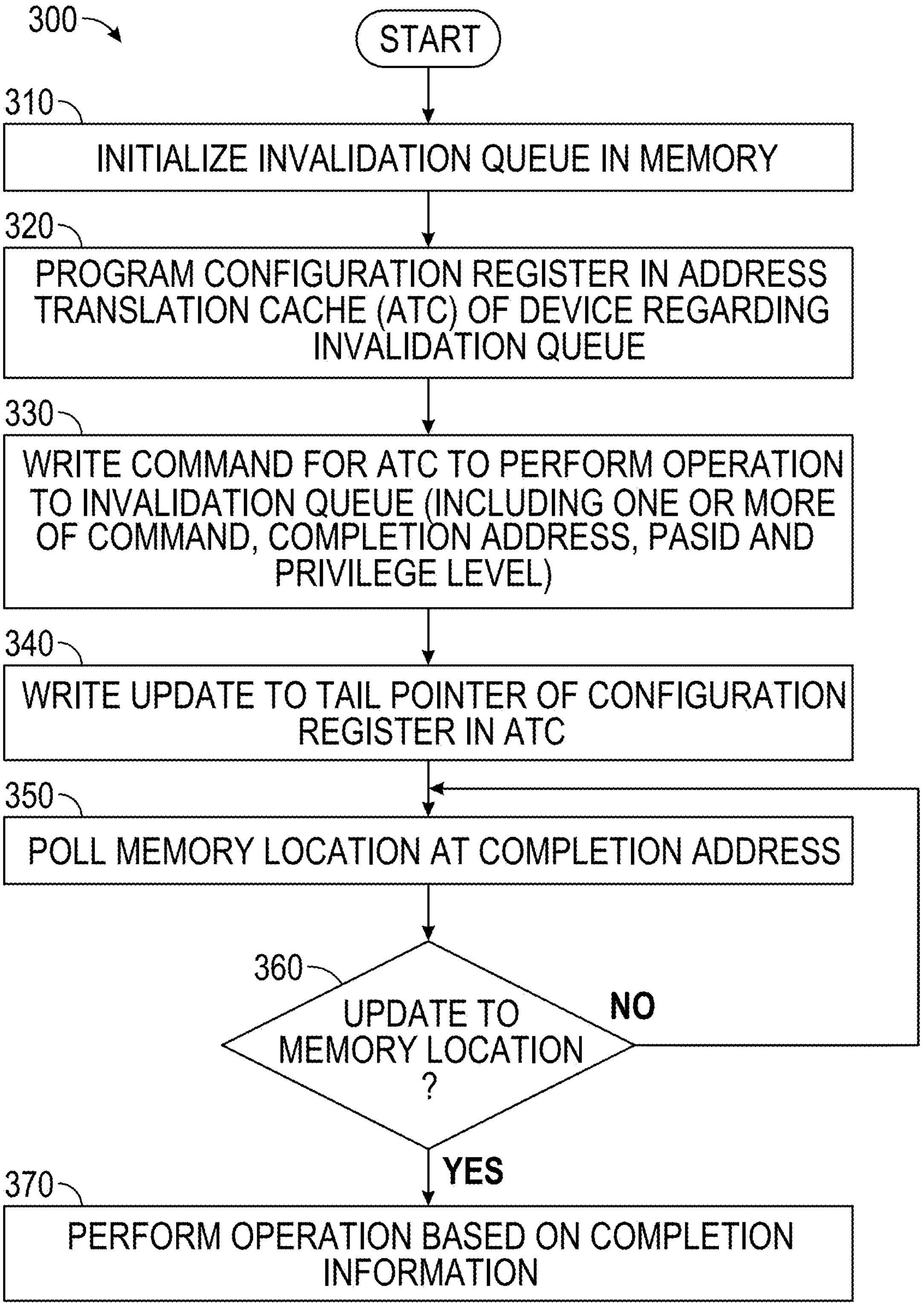
FIG. 3 is a flow diagram of a method in accordance with an embodiment.

Referring now to FIG. 3, shown is a flow diagram of a method in accordance with an embodiment. More specifically as shown in FIG. 3, method 300 is a method for direct software-to-ATC communication using an interface in accordance with an embodiment. Method 300 is shown from the point of view of software in execution on a host processor seeking to directly communicate with an ATC included in an accelerator or other XPU. As such, this software may leverage hardware circuitry of the host processor.

As illustrated, method 300 begins by initializing a device queue (which in this embodiment is an invalidation queue) in memory (block 310). Such initialization may be used to identify a base location for this queue, along with its parameters, including its size, capabilities and so forth. Next at block 320, the software may program a configuration register in the ATC of the device regarding the invalidation queue. In an embodiment, this programming may be implemented by communication of a configuration register write that includes various metadata for the device cache, including its base location, initial head and tail pointers, among potentially other information. Thus at this point the invalidation queue is appropriately initialized, and the ATC within the device is ready to perform commands responsive to communications along the interface.

Thus as further shown in FIG. 3, at block 330, a command for the ATC may be written to the invalidation queue. This command may be for the ATC to perform an operation. As one particular example, assume that the command is an invalidation command for the ATC to invalidate a particular entry within it. In addition to identification of this command, e.g., by way of an opcode or so forth, additional command metadata, including a completion address, PASID and privilege level information and so forth, also may be written into the invalidation queue. Thereafter at block 340, the software may write an update to a tail pointer of the configuration register in the ATC. By way of this tail pointer update, the ATC can identify presence of the command in the device queue.

Still referring to FIG. 3, control next passes to block 350 where the software may poll a memory location at the completion address. This is so, since when the ATC completes the requested operation of the command (e.g., an invalidation), it may write a completion message at the completion address to indicate successful completion (or to identify a failure). Next at diamond 360 the software can determine as a result of the polling whether this memory location at the completion address has been updated. In response to identification of the update, the software may determine whether the completion is successfully indicated and take some action such as re-allocate the memory location for another purpose/usage (block 370). And if the completion information indicates an error, some type of error resolution process may occur. Understand while shown at this high level in the embodiment of FIG. 3, many variations and alternatives are possible.

Figure 4:
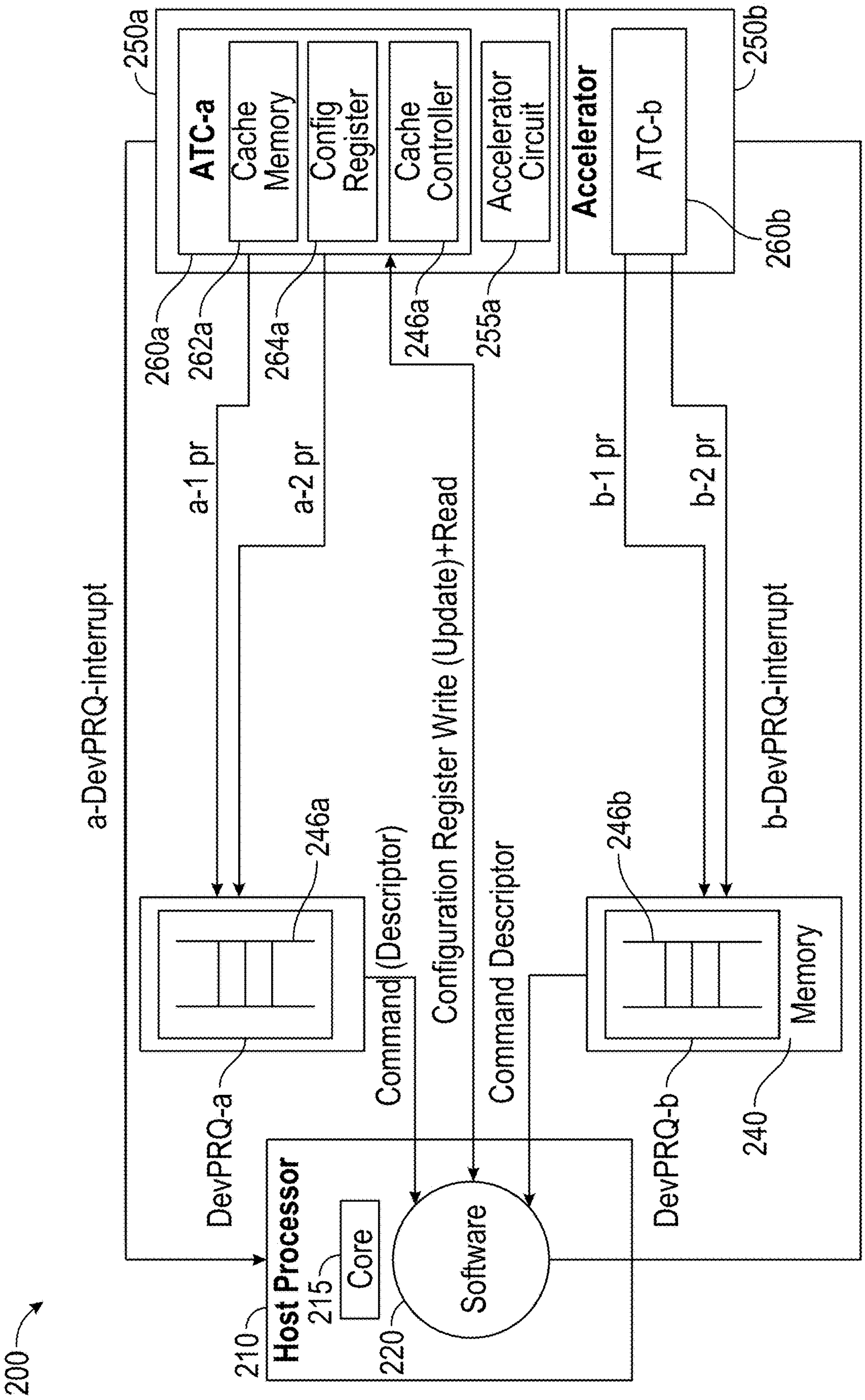
FIG. 4 is a block diagram of a computing system illustrating an interface in accordance with another embodiment.

Referring now to FIG. 4, shown is another system level illustration, including similar components to system 200 of FIG. 2. As such, the same reference numerals are used to refer to the same components, which are not further discussed here.

In FIG. 4, more particularly shown is a direct ATC-to-software communication interface. As shown in FIG. 4, ATC 260 may send command(s) to software 220 in accordance with various embodiments herein. For each ATC 260, software 220 may use a standard circular buffer in memory 240 with head/tail pointers to receive commands from ATC 260. ATC 260 writes the commands into this buffer using Memory Write opcodes, updates the tail pointer, and then sends an interrupt to inform software 220 that there are commands to process in the buffer. This buffer is shown in FIG. 4 as another device queue 246*a,b*, also referred to as a Device Page Request Queue (DevPRQ), and it may store commands from the specific ATC 260 (a or b). Note that an IOMMU is not involved in this process.

In one or more embodiments, the software may describe DevPRQ to ATC by programming one or more configuration registers included in an XPUs PCIe Configuration Space.

Queue Base—location of queue in memory

Head Pointer—offset from queue base where ATC will read the next command

Tail Pointer—offset from queue base where software will write the next command

DevPRQ PASID—PASID value to be used by ATC when writing Page Requests into DevPRQ DevPRQ Privilege—Privilege value to be used by ATC when writing Page Requests into DevPRQ DevPRQ Interrupt—MSI to be generated by ATC after writing Page Request into DevPRQ In a different embodiment, the DevPRQ MSI may be replaced by an entry in the MSI-x table.

Table 5 below describes various fields of the command that are common to all the types of commands.

TABLE 5

| Field Name | Field Description | Field Width (number of bits) |
|---|---|---|
| Command | Command to be performed by software | 5 |

Although various embodiments are described with respect to particular commands in DevPRQ, the command descriptor field of 5 bits may allow for inclusion of up to 32 commands and, if needed, the field can be expanded.

Additional fields when command is Page-Request-without-PASID are shown in Table 6, below.

TABLE 6

| Field Name | Field Description | Field Width (number of bits) |
|---|---|---|
| Page Address | Address of the Page for which ATC found insufficient permission | 52 |
| Page Group Index | This field contains an ATC supplied identifier for the associated page request. | 9 |
| Read Access Requested | This field, when Set, indicates that the ATC is requesting read access to the associated page. | 1 |
| Write Access Requested | This field, when Set, indicates that the ATC is requesting read access to the associated page. | 1 |
| Last Request in PRG | This field, when Set, indicates that the associated page request is the last request of the associated PRG. | 1 |

Additional fields when command is Page-Request-with-PASID are shown in Table 7, below.

TABLE 7

| Field Name | Field Description | Field Width (number of bits) |
|---|---|---|
| Page Address | Address of the Page for which ATC found insufficient permission | 52 |
| Page Group Index | This field contains ATC supplied identifier for the associated page request. | 9 |
| Read Access Requested | This field, when Set, indicates that the ATC is requesting read access to the associated page. | 1 |
| Write Access Requested | This field, when Set, indicates that the ATC is requesting read access to the associated page. | 1 |
| Last Request in PRG | This field, when Set, indicates that the associated page request is the last request of the associated PRG. | 1 |
| PASID | PASID associated with PRG | 20 |
| Privilege | This field, when Set, indicates that ATC is requesting permission for | 1 |

TABLE 7-continued

| Field Name | Field Description | Field Width (number of bits) |
|---|---|---|
| | supervisory entity. When Clear, ATC is requesting permission for user entity. | |

Some elements or fields may exist in the legacy ATS 1.0, but may not be used in ATS 2.0, such as Bus/Device/Function for each Page Request command as an identifier for each ATC. This information may not be needed as each ATC has its own DevPRQ, and the software implicitly knows which B/D/F is associated with each DevPRQ.

In an embodiment, ATC 260 may constantly monitor Head and Tail registers. For example, if Head=Tail−1, ATC 260 knows that DevPRQ is full, and it needs to wait and not generate any new Page Requests. If there is space in DevPRQ, ATC 260 can write a new Page Request into DevPRQ by issuing a Memory Write (which may go through IOMMU DMA remapping process just like any other DMA write) to an address calculated by adding Tail to the Base register. ATC 260 then sends an interrupt to software asking for processing of commands in DevPRQ. On receiving this Dev-PRQ-Interrupt, software may fetch one or more commands from DevPRQ and process them serially or in parallel. After completing each Page Request Group, software writes the Page Request Group Response in the appropriate DevIQ, as described previously.

Because ATC 260 is communicating with software 220 directly (without IOMMU as a "middle-man"), and because the ATC interface described herein may be implemented an industry standard, the software may be able to talk to all ATCs with a single piece of software that does not require vendor specific versions.

Figure 5:
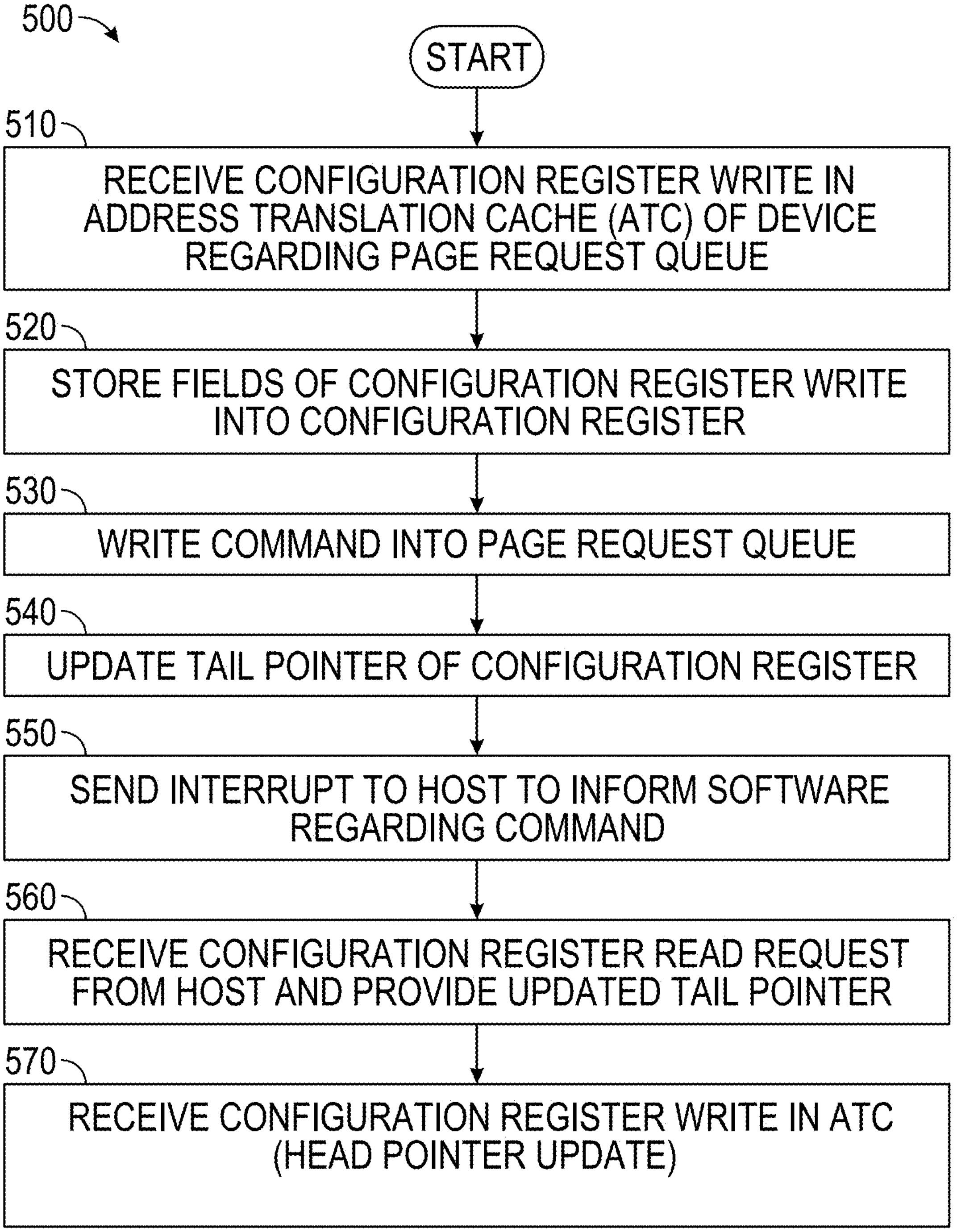
FIG. 5 is a flow diagram of a method in accordance with another embodiment.

Referring now to FIG. 5, shown is a flow diagram of a method in accordance with another embodiment. More specifically as shown in FIG. 5, method 500 is a method for direct ATC-to-software communication using an interface in accordance with an embodiment. Method 500 is shown from the point of view of an ATC included in an accelerator or other XPU. As such, the ATC may include hardware circuitry to perform method 500 alone, or in combination with firmware and/or software.

As illustrated, method 500 begins by receiving a configuration register write request in the ATC (block 510). This register write request may be used to identify metadata of a page request queue stored in a memory. For example, this metadata may include a base location, and initial head and tail pointers, among potentially other information. Next at block 520 this metadata may be stored into fields of one or more configuration registers. Thus at this point the ATC is ready to issue commands such as page requests using communications along the interface.

As further shown in FIG. 5, at block 530 the ATC may write a command into the page request queue. This command may be for the host processor to perform a page request operation such as obtaining or creating a new page translation for storage in the ATC. Thereafter at block 540, the ATC may update its tail pointer of the configuration register in the ATC.

Still referring to FIG. 5, control next passes to block 550 where the ATC may send an interrupt directly to the host processor to inform software regarding presence of the command. To this end, the ATC may send the interrupt to cause the software to send a configuration register read request, responsive to which the ATC provides an updated tail pointer (block 560). Understand that at this point, the software in execution on the host processor may access the command from the page request queue and perform the requested operation, e.g., providing a page translation for a given page for storage in the page request queue, handling a page fault or so forth. Then the software sends a configuration register write request to the ATC to update a head pointer at block 570. Understand while shown at this high level in the embodiment of FIG. 5, many variations and alternatives are possible.

Figure 6:
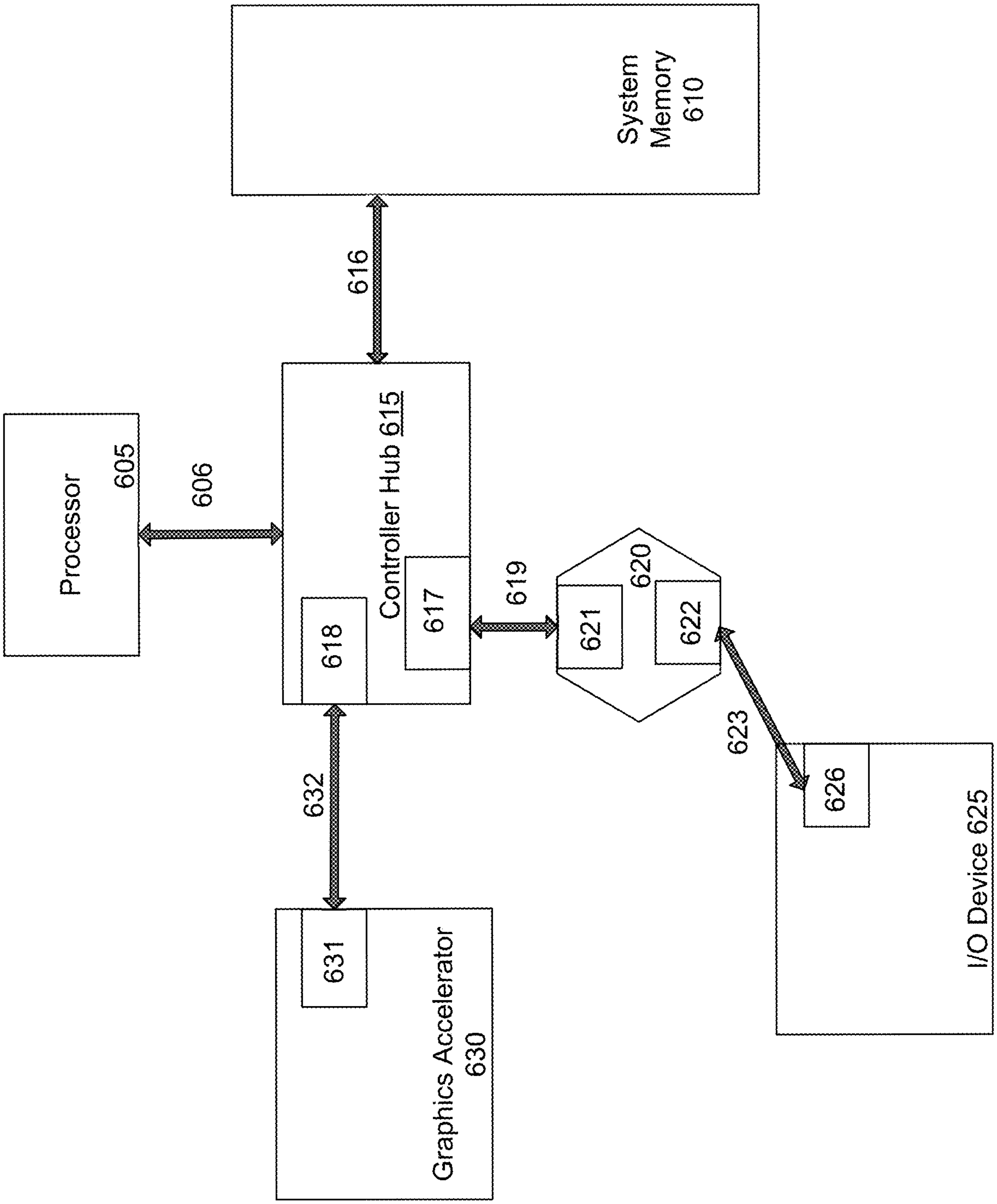
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and a flash memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect.

System memory 610 includes any memory device, such as random access memory (RAM), non-volatile (NV) memory, or other memory accessible by devices in system 600.

As shown, system memory 610 is coupled to controller hub 615 through memory interface 616. Examples of a memory interface include a double-data rate (DDR) memory interface, a dual-channel DDR memory interface, a dynamic RAM (DRAM), and/or a SPI memory interface.

In one embodiment, controller hub 615 is a root hub, root complex, or root controller in a PCIe interconnection hierarchy. Examples of controller hub 615 include a chipset, a memory controller hub (MCH), a northbridge, an interconnect controller hub (ICH), a southbridge or peripheral controller hub (PCH), and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615. Root complex 615 may include an IOMMU that, in a SVM model, enables a graphics accelerator 630 and/or a device 625 (which may include ATCs in accordance with an embodiment) to access a common memory space with processor 605.

Controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
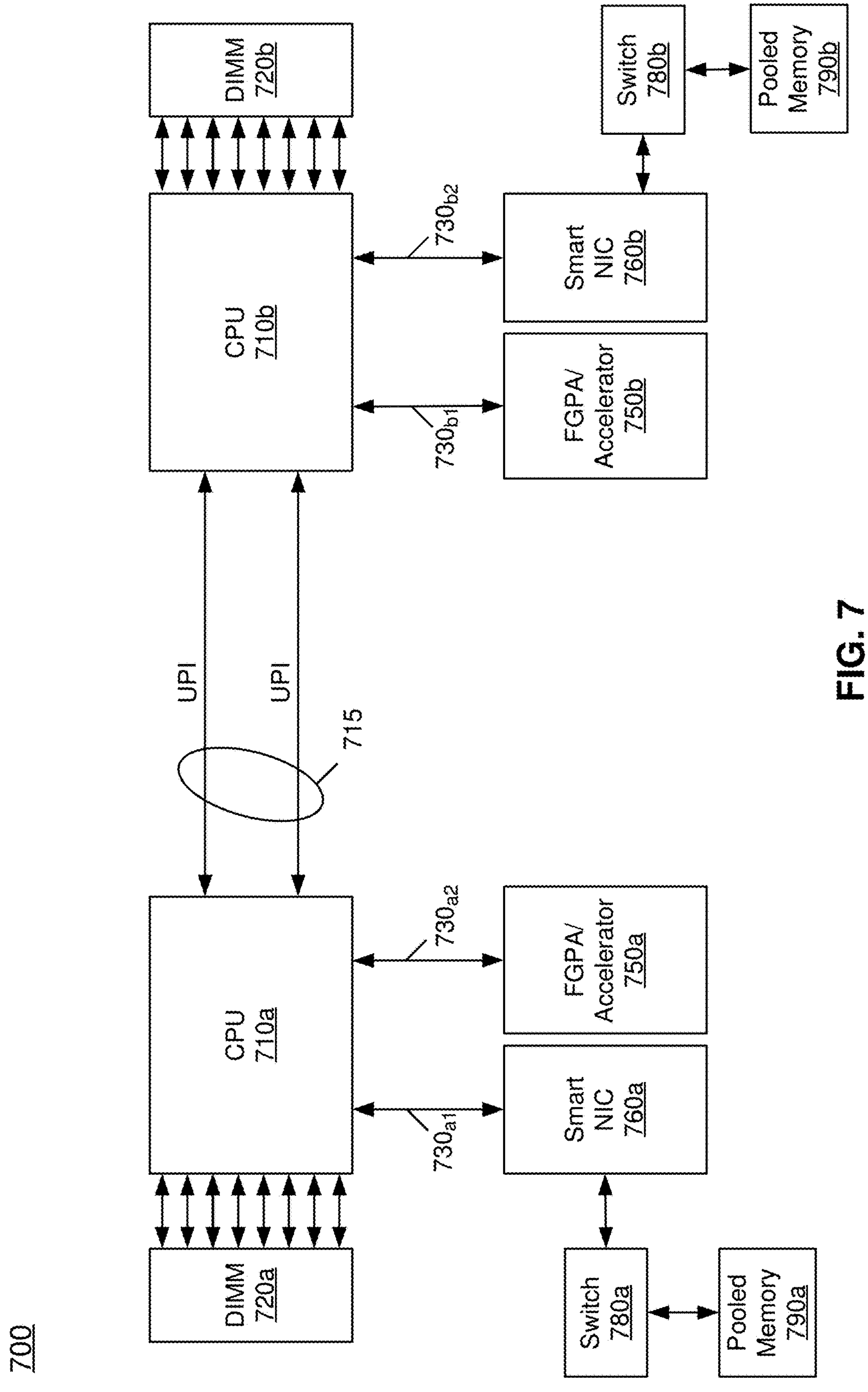
FIG. 7 is a block diagram of a system in accordance with another embodiment.

Referring now to FIG. 7, shown is a block diagram of a system in accordance with another embodiment. As shown in FIG. 7, a system 700 may be any type of computing device, and in one embodiment may be a server system. In the embodiment of FIG. 7, system 700 includes multiple CPUs 710*a,b* that in turn couple to respective system memories 720*a,b* which in embodiments may be implemented as DIMMs such as double data rate (DDR) memory, persistent or other types of memory. Note that CPUs 710 may couple together via an interconnect system 715 such as an Intel® Ultra Path Interconnect or other processor interconnect technology.

To enable coherent accelerator devices and/or smart adapter devices to couple to CPUs 710 by way of potentially multiple communication protocols, a plurality of interconnects 730*a*1-*b*2 may be present. In an embodiment, each interconnect 730 may be a given instance of a Compute Express Link (CXL) in which PCIe communications, including ATS communications may occur.

In the embodiment shown, respective CPUs 710 couple to corresponding field programmable gate arrays (FPGAs)/accelerator devices 750*a,b* (which may include GPUs or other accelerators may include ATCs in accordance with an embodiment. In addition CPUs 710 also couple to smart NIC devices 760*a,b*. In turn, smart NIC devices 760*a,b* couple to switches 780*a,b* that in turn couple to a pooled memory 790*a,b* such as a persistent memory. Of course, embodiments are not limited to accelerators 750 and the techniques and structures described herein may be implemented in other entities of a system.

Figure 8:
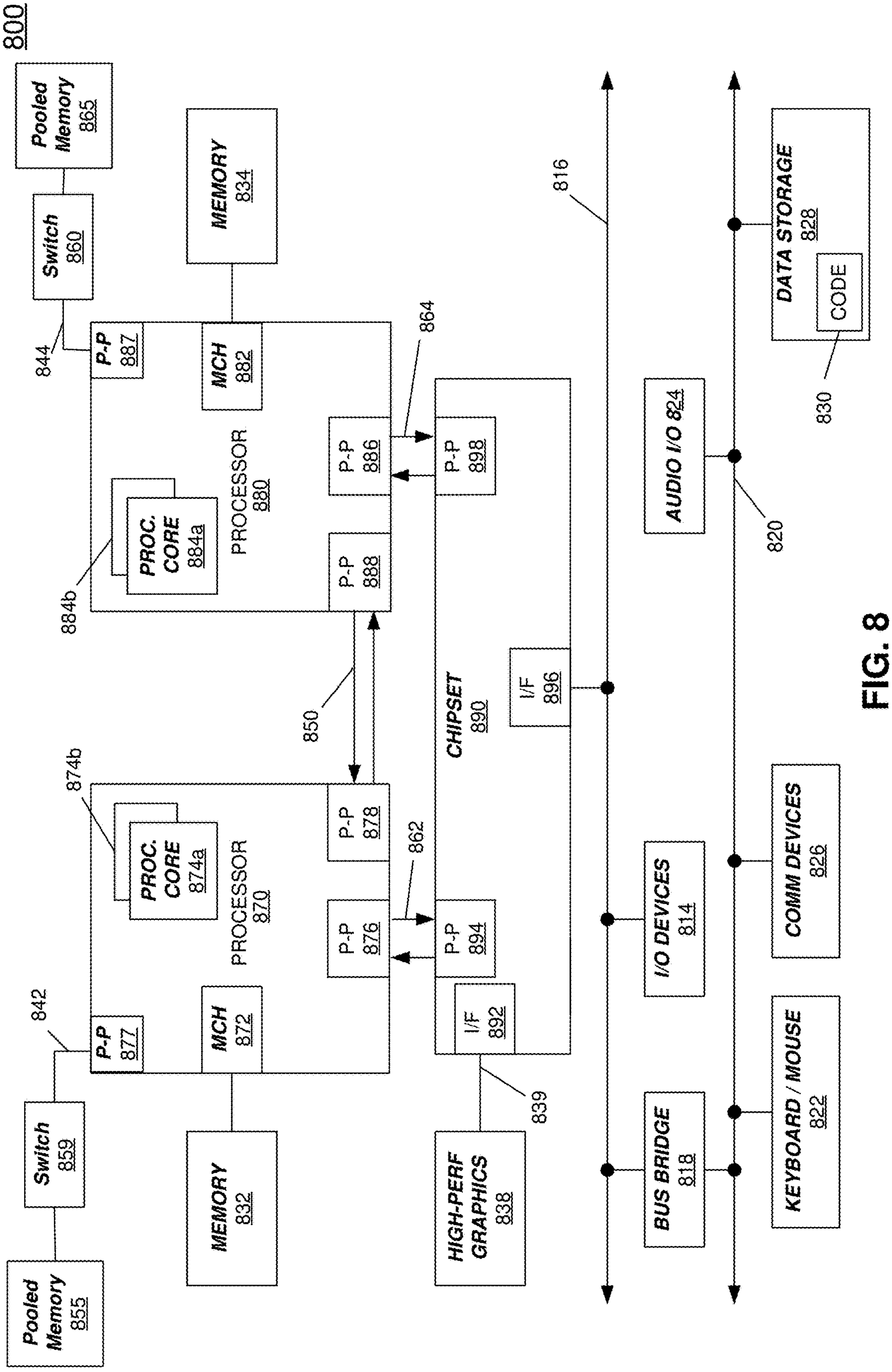
FIG. 8 is a block diagram of a system in accordance with another embodiment.

Referring now to FIG. 8, shown is a block diagram of a system in accordance with another embodiment such as a data center platform. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874*a* and 874*b* and processor cores 884*a* and 884*b*).

In the embodiment of FIG. 8, processors 870 and 880 further include point-to point interconnects 877 and 887, which couple via interconnects 842 and 844 (which may be CXL buses through which PCIe communications pass) to switches 859 and 860, which may include IOMMUs to enable devices having ATCs to access pooled memories 855 and 865.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 876 and 886, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

The following examples pertain to further embodiments.

In one example, an apparatus includes a core comprising at least one execution circuit, where the core is to: send a command for a first ATC of a first device to perform an operation, the core to send the command to a first device queue in a memory, the first device queue associated with the first ATC; and send a register write directly to the first device to inform the first ATC regarding presence of the command in the first device queue.

In an example, the core is to send an initialization message to the first device queue to indication initialization of the first device queue, the initialization message comprising metadata including a base address for the first device queue, a head pointer value and a tail pointer value.

In an example, the core is to send a second register write directly to the first device to cause the first ATC to update a tail pointer register of the first ATC.

In an example, where in response to the tail pointer register update, the first ATC is to read at least one command stored in the first device queue.

In an example, the at least one command comprises an invalidation command.

In an example, software in execution on the core is to poll a completion address specified in the command in the memory to identify when the first ATC has completed the operation of the command.

In an example, the first ATC is to write a completion message to the completion address specified in the command after completion of the operation of the command.

In an example, the core is to receive an interrupt from a first ATC, the interrupt to indicate presence of a second command from the first ATC for a software in execution on the core to perform another operation.

In an example, in response to the interrupt, the core is to read a tail pointer register of the first ATC to identify a location of the second command in another device queue.

In an example, the core is to receive the second command comprising a page request to provide a translation for a page of the memory.

In an example, the core is to: send a second command for a second ATC of a second device to perform an operation, the core to send the second command to a second device queue in the memory, the second device queue associated with the second ATC and separate from the first device queue; and send a register write directly to the second device to inform the second ATC regarding presence of the second command in the second device queue.

In another example, a method comprises: receiving, in an ATC of a device coupled to a processor, a first register write request; writing information of the first register write request into one or more configuration registers associated with the ATC; receiving, in the ATC, a second register write request directly from the processor; and executing an operation in the ATC in response to command information obtained from a location in an ATC queue of a memory coupled to the device, the location identified by the second register write request.

In an example, the method further comprises, after executing the operation in the ATC, sending completion information to the memory, for storage at a completion address.

In an example, the method further comprises sending the completion information for storage at the completion address, the completion address included in the command information.

In an example, the method further comprises sending, from the ATC, an interrupt directly to the processor to inform the processor regarding presence of the command information.

In an example, the method further comprises receiving, in the ATC, a register read request from the processor and, in response to the register read request, providing a value of a tail pointer register of the ATC to the processor.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system includes an accelerator comprising: at least one functional circuit; and an ATC coupled to the at least one functional circuit, the ATC comprising: at least one configuration register to store a pointer to a location in a queue associated with the ATC, the queue in a shared memory; and where the ATC is to directly communicate with software in execution on a processor. The system further includes the processor coupled to the accelerator and the shared memory coupled to the processor and the accelerator.

In an example, the ATC is to send a command for storage in the queue and update the pointer stored in the configuration register to indicate presence of the command in the queue.

In an example, the command comprises a page request and the ATC is to identify completion of a page request operation by the processor on receipt of a page response command from the software, the page response command stored in another queue in the shared memory.

In an example, the system further comprises an IOMMU coupled to the processor and the accelerator, where the direct communication between the software and the ATC is to bypass the IOMMU.

Understand that various combinations of the above examples are possible.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:

a core comprising at least one execution circuit, wherein the core is to:

send a command for a first address translation cache (ATC) of a first device to perform an operation, the core to send the command to a first device queue in a memory, the first device queue associated with the first ATC; and send a register write directly to a configuration register of the first device to update a tail pointer register of the first ATC, the update informing the first ATC of presence of the command in the first device queue, wherein the direct register write bypasses an input/output memory management unit (IOMMU) to enable parallel communication between the core and the first ATC.

2. The apparatus of claim 1, wherein the core is to send an initialization message to the first device queue to indication initialization of the first device queue, the initialization message comprising metadata including a base address for the first device queue, a head pointer value and a tail pointer value.

3. The apparatus of claim 1, wherein the core is to send a second register write directly to the first device to cause the first ATC to update a tail pointer register of the first ATC.

4. The apparatus of claim 3, wherein in response to the tail pointer register update, the first ATC is to read at least one command stored in the first device queue.

5. The apparatus of claim 4, wherein the at least one command comprises an invalidation command.

6. The apparatus of claim 1, wherein software in execution on the core is to poll a completion address specified in the command in the memory to identify when the first ATC has completed the operation of the command.

7. The apparatus of claim 6, wherein the first ATC is to write a completion message to the completion address specified in the command after completion of the operation of the command.

8. The apparatus of claim 1, wherein the core is to receive an interrupt from a first ATC, the interrupt to indicate presence of a second command from the first ATC for a software in execution on the core to perform another operation.

9. The apparatus of claim 8, wherein, in response to the interrupt, the core is to read a tail pointer register of the first ATC to identify a location of the second command in another queue.

10. The apparatus of claim 8, wherein the core is to receive the second command comprising a page request to provide a translation for a page of the memory.

11. The apparatus of claim 1, wherein the core is to:

send a second command for a second ATC of a second device to perform an operation, the core to send the second command to a second device queue in the memory, the second device queue associated with the second ATC and separate from the first device queue; and send a register write directly to the second device to inform the second ATC regarding presence of the second command in the second device queue.

12. A method comprising:

receiving, in an address translation cache (ATC) of a device coupled to a processor, a first register write request;

writing information of the first register write request into one or more configuration registers associated with the ATC;

receiving, in the ATC, a second register write request directly from the processor;

updating a tail pointer in a configuration register of the ATC based on the second register write request, the tail pointer identifying a location of a command in an ATC queue of a memory coupled to the device, wherein the second register write request updates a tail pointer register of the ATC and bypasses an input/output memory management unit (IOMMU) to enable parallel communication between the processor and the ATC; and executing an operation in the ATC in response to command information obtained from a location in an ATC queue of a memory coupled to the device, the location identified by the second register write request.

13. The method of claim 12, further comprising, after executing the operation in the ATC, sending completion information to the memory, for storage at a completion address.

14. The method of claim 13, further comprising sending the completion information for storage at the completion address, the completion address included in the command information.

15. The method of claim 13, further comprising sending, from the ATC, an interrupt directly to the processor to inform the processor regarding presence of the command information.

16. The method of claim 13, further comprising receiving, in the ATC, a register read request from the processor and, in response to the register read request, providing a value of a tail pointer register of the ATC to the processor.

17. A system comprising:

an accelerator comprising:

at least one functional circuit; and an address translation cache (ATC) coupled to the at least one functional circuit, the ATC comprising:

at least one configuration register to store a head pointer and a tail pointer to locations in a queue associated with the ATC, the queue in a shared memory; and wherein the ATC is to directly communicate with software in execution on a processor;

the processor coupled to the accelerator; and the shared memory coupled to the processor and the accelerator, wherein the direct communication comprises a register write to update the tail pointer that bypasses an input/output memory management unit (IOMMU) to enable parallel communication between the processor and the ATC.

18. The system of claim 17, wherein the ATC is to send a command for storage in the queue and update the pointer stored in the configuration register to indicate presence of the command in the queue.

19. The system of claim 18, wherein the command comprises a page request and the ATC is to identify completion of a page request operation by the processor on receipt of a page response command from the software, the page response command stored in another queue in the shared memory.

20. The system of claim 17, further comprising an input/output memory management unit (IOMMU) coupled to the processor and the accelerator, wherein the direct communication between the software and the ATC is to bypass the IOMMU.

* * * * *